United States Patent [19]

Yamashita et al.

[11] Patent Number: 4,738,013
[45] Date of Patent: Apr. 19, 1988

[54] METHOD AND APPARATUS FOR ATTACHING A RING-LIKE PART TO THE OUTER PERIPHERY OF COLUMNAR MATERIAL

[75] Inventors: Sachihiro Yamashita, Hidaka; Masayuki Enomoto, Sayama; Ichiro Ishibashi, Iruma; Kiyohiro Ichinose, Moroyama; Mitsuki Nakamura, Niiza, all of Japan

[73] Assignee: Honda Giken Kogyo Kabushiki Kaisha, Tokyo, Japan

[21] Appl. No.: 898,070

[22] Filed: Aug. 19, 1986

[30] Foreign Application Priority Data

Aug. 23, 1985 [JP] Japan ................................ 60-185202

[51] Int. Cl.$^4$ ...................... B21D 53/00; B23P 19/00
[52] U.S. Cl. .................................. 29/157 R; 29/33 K; 29/33 T; 29/428; 29/464; 29/525; 29/700; 29/797; 29/282; 422/168
[58] Field of Search ................ 29/157 R, 33 K, 33 T, 29/428, 464, 467, 525, 559, 700, 795, 797, 282, 281.5; 422/168, 169, 170, 171, 177, 178; 181/256, 257, 272

[56] References Cited

U.S. PATENT DOCUMENTS 3,858,297 1/1975 Scholin et al. .................... 29/797 X
4,269,807 5/1981 Bailey et al. .................. 29/157 R X Primary Examiner—P. W. Echols
Assistant Examiner—Ronald S. Wallace
Attorney, Agent, or Firm—Armstrong, Nikaido, Marmelstein & Kubovcik

[57] ABSTRACT

The present invention provides a method and apparatus for attaching a ring-like part to the outer periphery of a columnar material, as, for example, in the assembling of a catalytic converter. The columnar material is positioned and supported with its axis oriented horizontally. A guide member is supported from the side to position it adjacent to the columnar material on the same axis as the columnar material. The guide member has an outer inclined surface enlarged towards the columnar material. The guide member is then supported in the axial direction and at the same time, has the side support thereof released. The ring-like part is then pushed while guiding it on the outer inclined surface of the guide member to fit it over a portion of the columnar material. The pushing of the ring-like part is released and then the guide member is again supported from the sides, while at the same time, the support thereof from the axial direction is released. Using the disclosed method and apparatus, it is possible to attach the ring-like part to the columnar material without previously passing the ring-like part over the guide member.

9 Claims, 13 Drawing Sheets

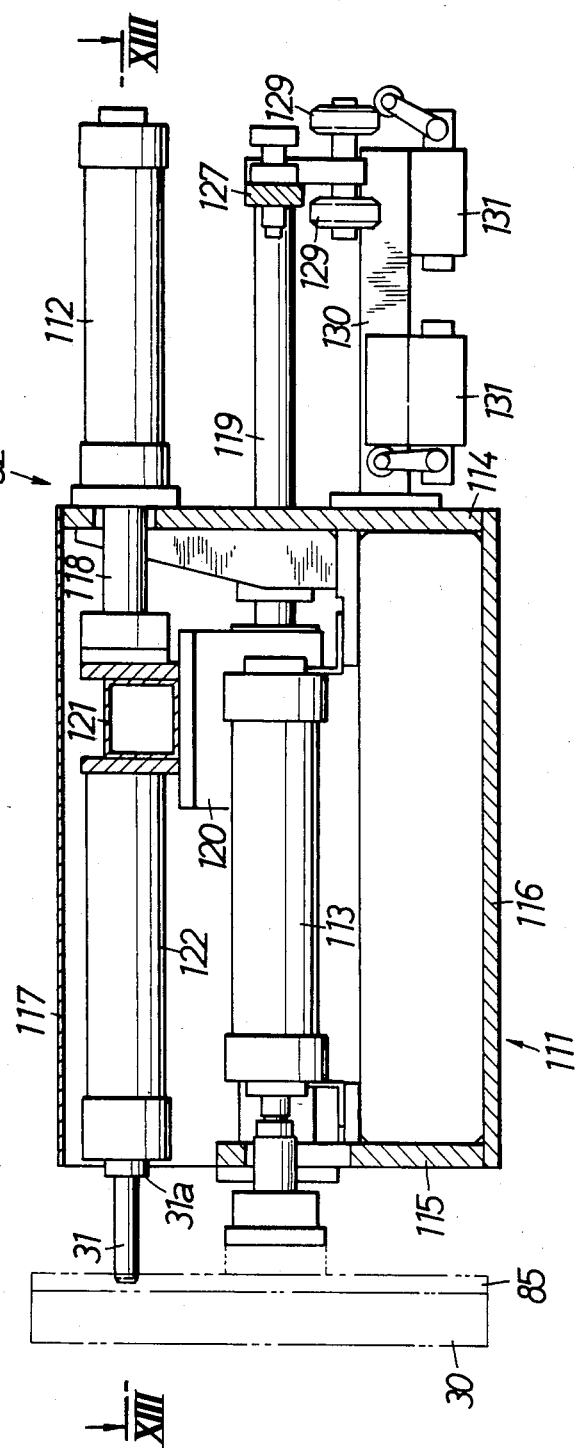

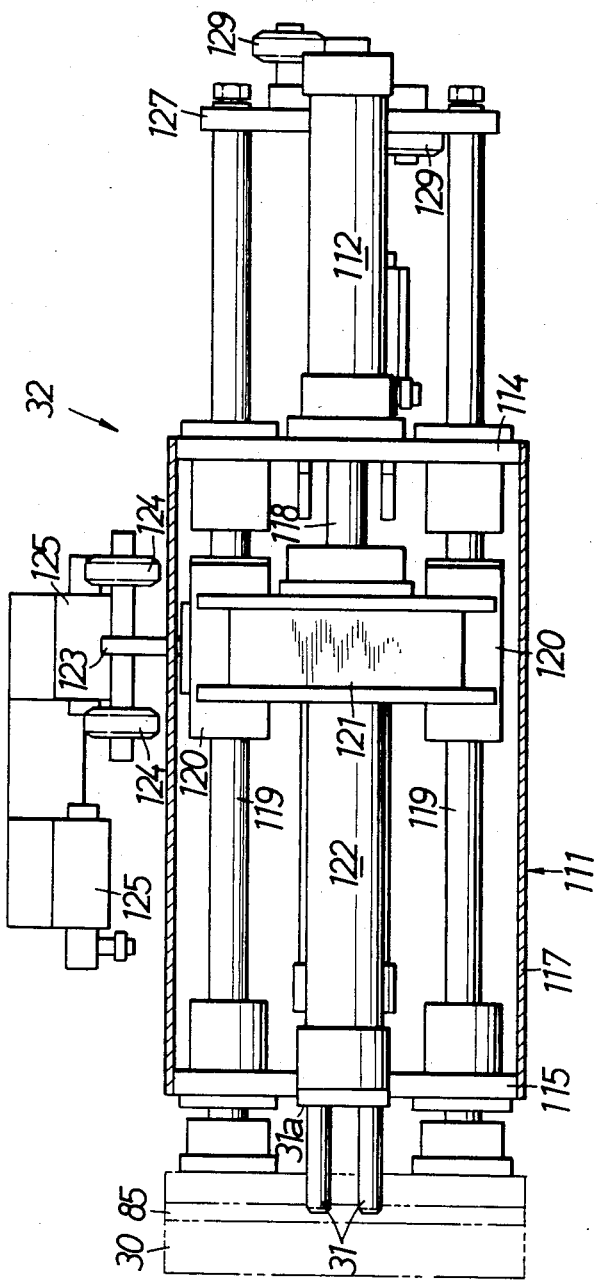

METHOD AND APPARATUS FOR ATTACHING A RING-LIKE PART TO THE OUTER PERIPHERY OF COLUMNAR MATERIAL

BACKGROUND OF THE INVENTION

1. Field of the Invention

The present invention relates to a method and apparatus for attaching a ring-like part to the outer periphery of a columnar material.

2. Description of the Prior Art

In attaching a mesh ring to the outer periphery of a columnarly-formed catalyst within a casing, the ring being positioned between the catalyst and the inner surface of a casing, as for example, in the assembling of a catalytic converter, it has been normal to position a guide member above a vertically disposed catalyst and guide the mesh ring using the guide member to thereby fit the mesh ring over the outer periphery of the catalyst from above.

With this conventional method, however, it is necessary to pass the mesh ring over the guide member prior to placing it around the catalyst. In addition, when other processing is applied to the columnar material, as for example, when a seal mat is wound around the catalyst, it may be necessary to turn the columnar material horizontally and then attach the seal mat thereto.

SUMMARY OF THE INVENTION

It is therefore an object of the present invention to provide a method and apparatus for attaching a ring-like part to a columnar material which enables the attaching of the ring-like part to the columnar material when it is oriented horizontally and eliminates the need for the prior passing of the ring-like part over a guide member. Further, simultaneous processing of the columnar material is possible because of the horizontal orientation.

It is another object of the present invention to provide an apparatus for attaching a ring-like part to the outer periphery of a columnar material wherein the columnar material can be reliably positioned and supported substantially horizontally with one end raised in order to attach the ring-like part thereto.

It is a further object of the present invention to provide an apparatus for attaching a ring-like part to the outer periphery of a columnar material wherein a guide member for guiding the ring-like part is supported to avoid interference with the movement of the ring-like part, and the guide member can be brought into close contact with the outer periphery of the columnar material so that the ring-like part is smoothly guided to the columnar material.

It is yet a further object of the present invention to provide an apparatus for attaching a ring-like part to the outer periphery of a columnar material wherein a drive mechanism for moving the ring-like part for attachment to the columnar material can be properly actuated and is of a simple construction.

To accomplish the above objects, the present invention is directed to a method for attaching a ring-like part to the outer periphery of a columnar material. The method comprises positioning and supporting the columnar material with its axis oriented substantially horizontally and supporting a guide member from the sides to position it adjacent to the columnar material on the same axis as the columnar material. The guide member has an outer inclined surface enlarged towards the columnar material and the ring-like part, which is to be attached, is positioned on the same axis as the columnar material. The guide member is supported from an axial direction and at the same time, the side supporting thereof is released sides and the ring-like part is pushed while guiding it on the outer inclined surface of the guide member to fit it over the to-be-attached portion of the columnar material. The pushing on the ring-like part is released and the guide member is then again supported from the sides, while at the same time, the supporting thereof from the axial direction is released.

In addition, the present invention is directed to an apparatus for attaching a ring-like part to the outer periphery of a columnar material. The apparatus comprises a positioning rest on which the columnar material is placed and positioned with its axis oriented horizontally with the portion to which the ring-like part is to be attached being exposed. A guide mechanism includes a guide member having an outer inclined surface enlarged towards the columnar material and a clamp mechanism supports the guide mechanism from the sides to position the guide member on the same axis as the columnar material at a position adjacent to the columnar material laid on the positioning rest. A support arm is axially movable to support the guide mechanism in the axial direction and a holding and urging mechanism supports the ring-like part on the same axis as the columnar material and is movable to push the ring-like part toward the columnar material. A drive mechanism is connected to the support arm and the holding and urging mechanism.

With the above method, prior to attaching the ring-like part, the supporting of the guide member from the sides is released and the guide member is supported in the axial direction. Therefore, it is possible to push the ring-like part towards the columnar material. In addition, since the ring-like part is guided by the guide member and moves towards the columnar material, the smooth attachment of the ring-like part to the columnar material may be ensured.

In addition, with the above apparatus of the present invention, the supporting of the guide member is provided by the clamp mechanism and the support arm. Accordingly, the support of the guide member can be changed from supporting the sides to supporting in the axial direction to prevent the interference with the movement of the ring-like part, and in this way, the holding and urging mechanism is moved to provide the attaching of the ring-like part to the outer periphery of the columnar material.

BRIEF DESCRIPTION OF THE DRAWINGS

FIG. 12 is an enlarged sectional view taken along the line XII—XII of FIG. 3;

FIG. 13 is a sectional view taken along the line XIII—XIII of FIG. 12; and

DETAILED DESCRIPTION OF THE PREFERRED EMBODIMENT

Figure 1:
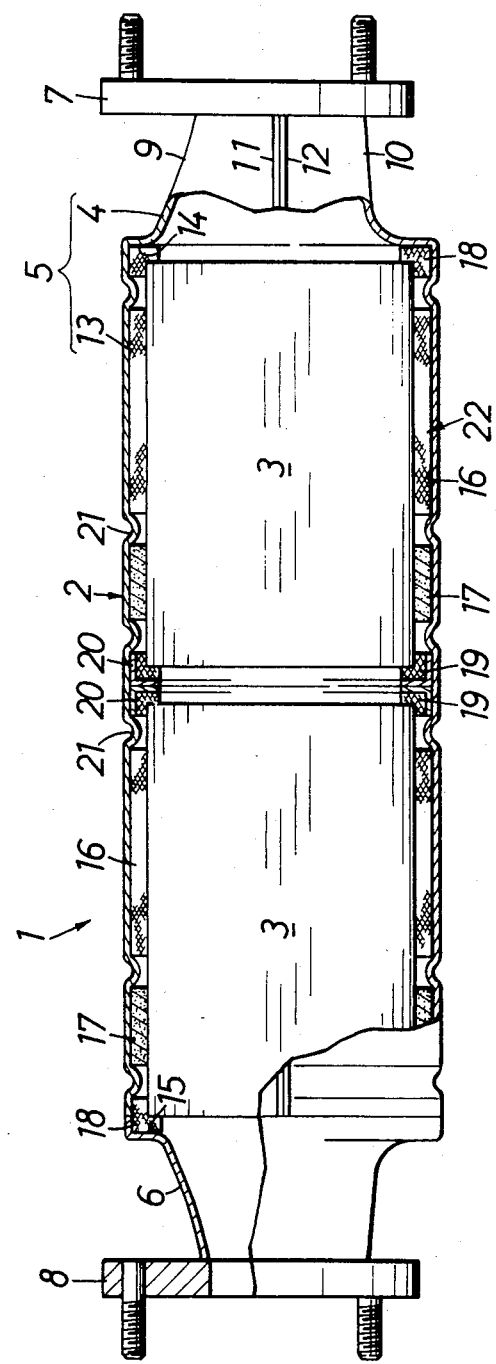
FIG. 1 is a vertical sectional view of a catalytic converter.

The present invention will now be described with reference to the accompanying drawings. Referring first to FIG. 1, a catalytic converter 1 is mounted in an exhaust system of an internal combustion engine for a vehicle (not shown) and includes a casing 2 containing a pair of catalysts 3 axially positioned therein. Each of the catalysts 3 is formed into a columnar shape, for example, having an elliptic cross-section. Upon the passing of the exhaust gas through the catalysts 3, harmful gases such as HC, CO and $NO_x$ in the exhaust gas are removed through the acceleration of oxidation and reduction reactions.

The casing 2 comprises a shell 5 made of a stainless steel plate. The shell 5 has, at one end thereof, a first end cone 4 and at the other end thereof, a second end cone 6 made of stainless steel plate and welded thereto. Flanges 7 and 8 secured to end cones 4 and 6 are for connecting the converter to an exhaust pipe.

The shell 5 is formed into a tube having an elliptic cross-section and consists of a pair of shell halves 9 and 10 bisected along the axial direction over its entire length and welded to each other. Binding jaws 11 and 12, bearing against each other, are mounted at the peripherally opposite ends of the shell halves 9 and 10, respectively. The shell 5 is formed by welding the binding jaws 11 and 12 which bear against each other.

The shell 5 formed from the shell halves 9 and 10 connected to each other, has a tubular portion 13. One end of tubular portion 13 is connected to the end cone 4 through a shoulder 14, and to the other end of tubular portion 13 is welded to the second end cone 6 having a shoulder 15.

A mesh ring 16 and a seal mat 17 are interposed between the outer peripheral surface of each catalyst 3 and the inner surface of the tubular portion 13 of the casing 2. The mesh ring 16 is formed into a ring-like net having the resiliency of a knit fabric made, for example, from fine stainless steel wires, and functions to prevent the destruction of the catalyst 3 due to vibration. The seal mat 17 is wound around the outer periphery of the catalyst 3 and functions to prevent the gas from passing between the catalyst 3 and the tubular portion 13.

A ring-like end protecting member 18 made of the same material as the mesh ring 16 is positioned between the casing 2 and each of the non-opposing ends of the catalysts 3. The end protecting member 18 has a substantially L-shaped cross-section, and abuts at its inner surface against the outer peripheral surface of and the end surface of the catalyst 3 and abuts at its outer surface against the inner surface of and the shoulder 14 or 15 of the tubular portion 13.

An end protecting member 19 which is made of the same material and has the same configuration as the end protecting member 18, is mounted on each of the opposing ends of the catalysts 3. A ring-like protector 20 having a substantially L-shaped cross-section is interposed between the outer surface of each end protecting member 19 and the inner surface of the tubular portion 13 in the casing 2. The protectors 20 abut against each other.

A plurality of inwardly depressed recesses 21 are provided in the casing 2 over the entire periphery thereof at locations between individual adjacent ones of the components 16 to 20, for the purpose of determining the respective positions of the mesh ring 16, the seal mat 17, the end protecting members 18 and 19 and the protectors 20.

In assembling the catalytic converter 1, an insert assembly 22 is previously prepared. The assembly 22 comprises the mesh ring 16 and the seal mat 17 both mounted on the catalyst 3.

Figure 2:
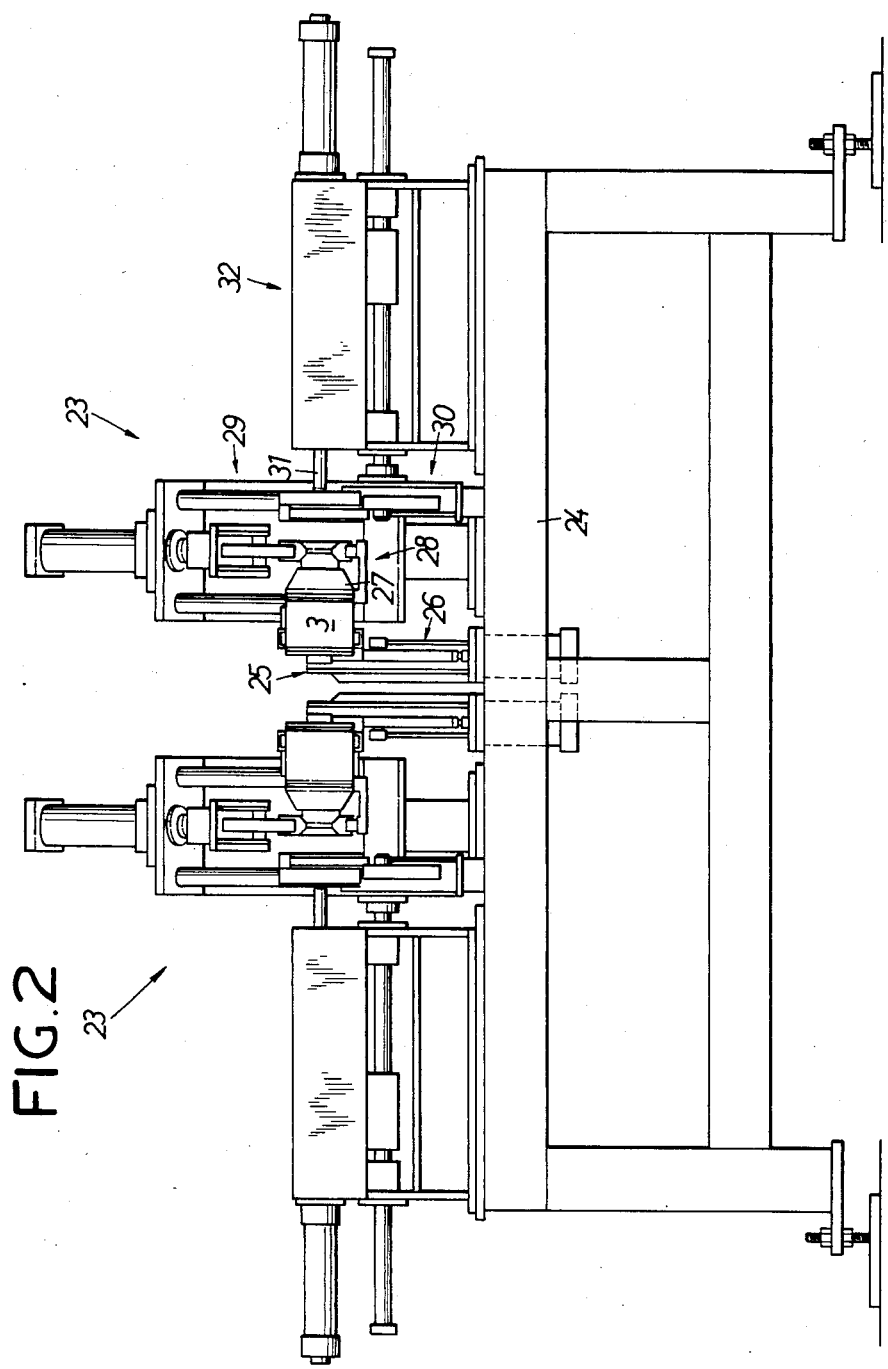
FIG. 2 is a side view of a complete assembling apparatus of the present invention.
Figure 3:
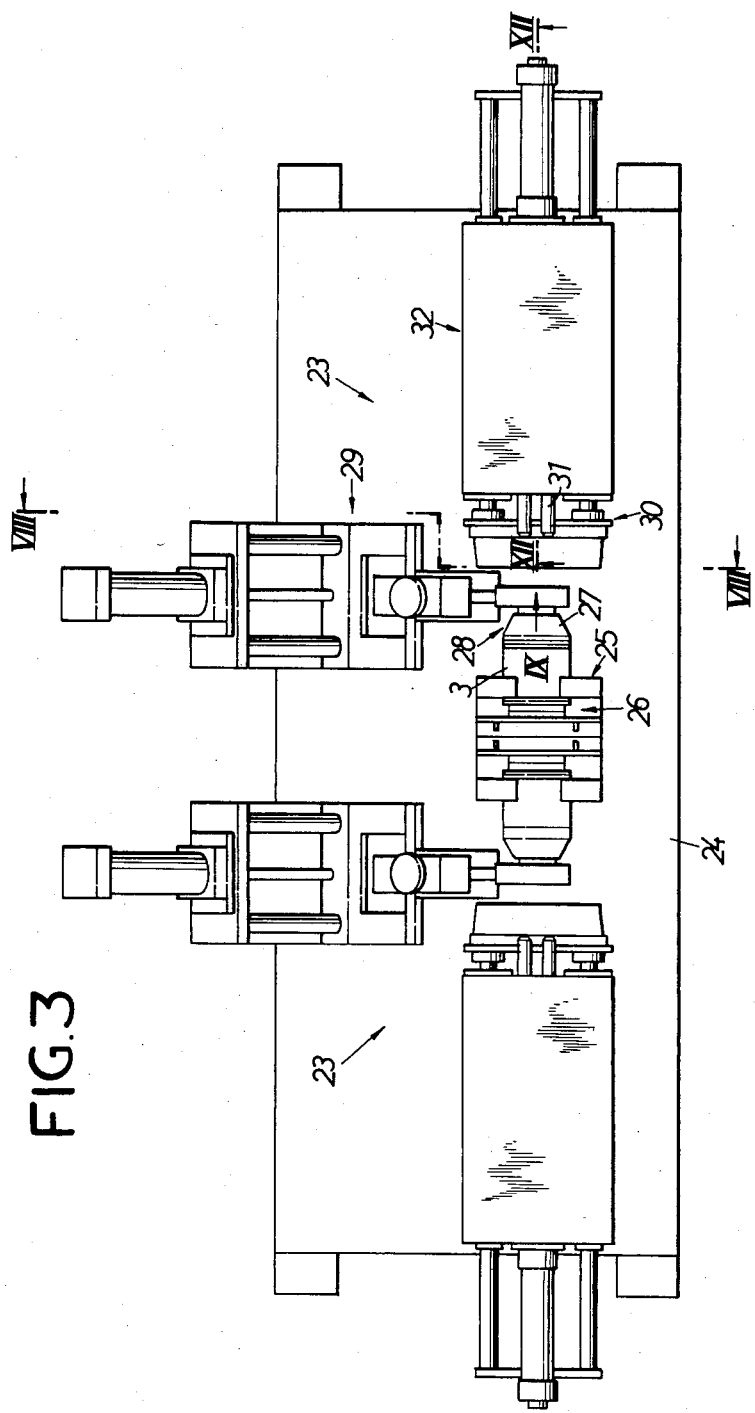
FIG. 3 is a plan view of the complete assembling apparatus.

FIGS. 2 and 3 illustrate apparatus for assembling the insert assembly 22. A pair of assembling devices 23 are symmetrically arranged on a base 24 for simultaneously producing a pair of insert assemblies 22.

The assembling device 23 comprises a positioning rest 25 on which the catalyst 3 is placed and positioned with its axis oriented substantially horizontally. A winding mechanism 26 winds the seal mat 17 around one end of the catalyst 3 and a guide mechanism 28 including a guide member 27 is disposed on the same axis as the catalyst 3 on the positioning rest 25. A clamp mechanism 29 is operable to releasably support the guide member 27 from the side thereof, and a holding and urging mechanism 30 is movable on the base 24 while resiliently holding the mesh ring 16. A support arm 31 is movable on the same axis as the guide member 27 to support one end of the guide member 27, and a drive mechanism 32 drives the holding and urging mechanism 30 and the support arm 31.

Figure 4:
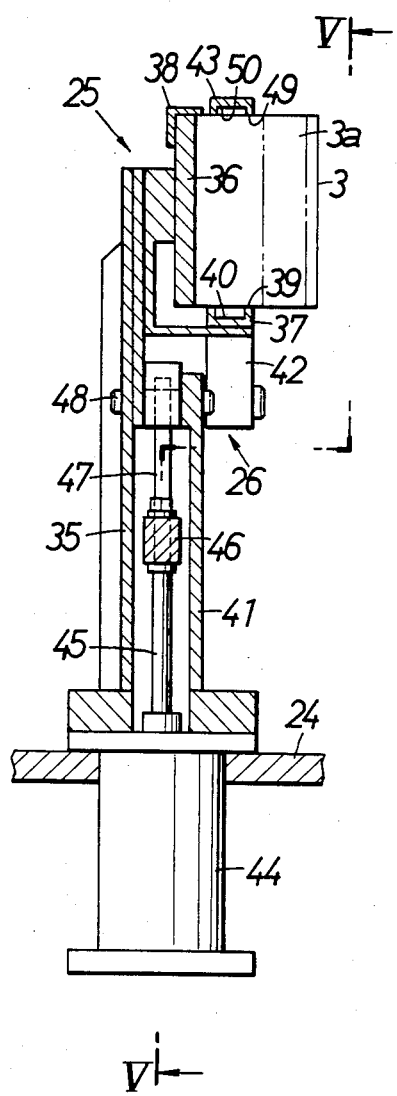
FIG. 4 is an enlarged side view in vertical section of a positioning rest and a winding mechanism of the present invention.
Figure 5:
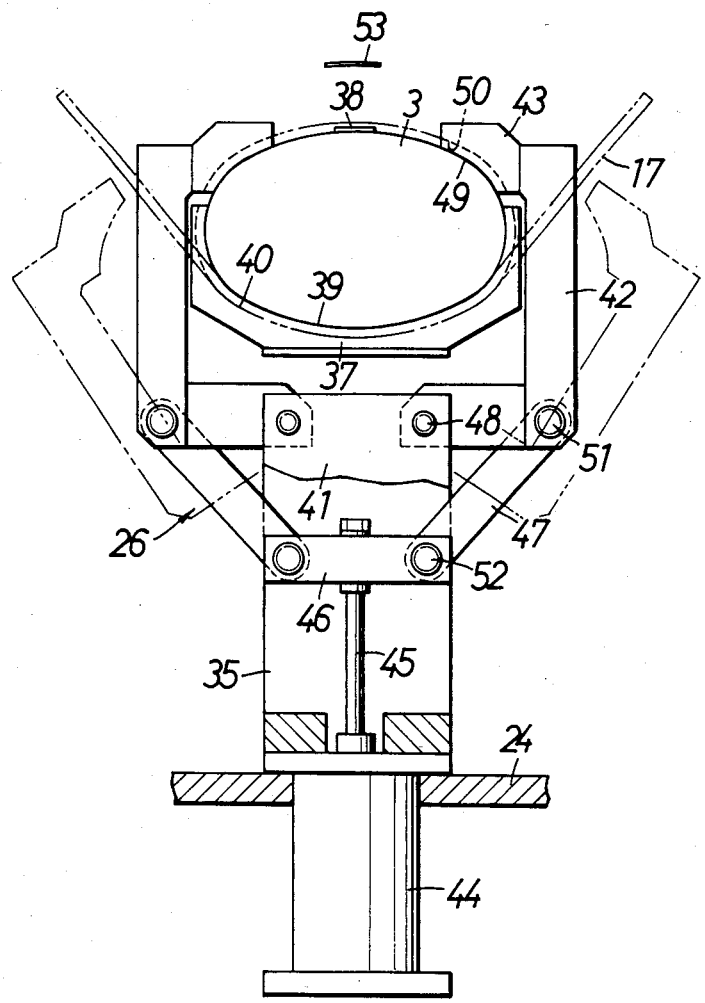
FIG. 5 is a sectional view taken along the line V—V of FIG. 4.

Referring to FIGS. 4 and 5, the positioning rest 25 is fixedly mounted near the central portion of the base 24 so that the catalyst 3 may be positioned on the positioning rest 25, with the portion 3a of catalyst 3, to which the mesh ring 16 is to be attached, being exposed. More specifically, the positioning rest 25 comprises a post 35 mounted on the base 24, an abutment plate 36 fixedly mounted on the upper portion of the post 35 opposed to that end surface of the catalyst 3 around which the seal mat 17 is wound. A receiving member 37 is fixedly mounted on the post 35 to receive the lower outer peripheral surface of the catalyst 3, i.e., a portion around which the seal mat 17 is to be wound, an an arrest member 38 is fixedly mounted on the upper portion of the abutment plate 36 and adapted to engage the upper end edge portion of the catalyst 3 for inhibiting the rising of the catalyst 3 on the receiving member 37. The receiving member 37 includes a receiving surface 39 curved to conform to the outer half peripheral surface of the catalyst 3, and a groove 40 into which the seal mat 17 is fitted, opens upwardly in the receiving surface 39.

With the positioning rest 25, the catalyst 3 is positioned thereon with it axis oriented horizontally such that the catalyst 3 is placed on the receiving surface 39 of the receiving member 37 and the arrest member 38 is in engagement with the upper end edge of the catalyst 3.

The winding mechanism 26 includes a support plate 41 mounted below the receiving plate 37 and set on the base 24 in an opposed relation with the post 35. A pair of pivotal arms are supported for pivotal movement between the post 35 and the support arm 41 and arrest claws 43 are fixedly mounted on the forward end of respective pivotal arms 42. A swinging cylinder 44 is supported on the base 24 with its axis vertically extending between the post 35 and the support plate 41, a connecting plate 46 is connected to the upper end of a piston 45 extending upwardly from the upper end of the swinging cylinder 44, and links 47 are each connected between each of the opposite ends of the connecting plate 46 with the intermediate portion of each pivotal arm 42.

Each pivotal arm 42 is L-shaped and pivotally supported at its base end by a pivot 48 which has an axis parallel to the catalyst 3 in the receiving member 37. Each pivot arm extends below the receiving member 37 between the post 35 and the support plate 41. The arrest claw 43 includes an arrest surface 49 which is curved to conform to the upper outer surface of the catalyst 3 on the receiving member 37 and is provided with a groove 50 diametrically opposed to the groove 40 of the receiving member 37.

Each of the links 47 is connected at one end thereof to the intermediate portion of each pivotal arm 42 through a pin 51 which is parallel to the pivot 48 and at the other end thereof is connected to one of the opposite ends of the connecting plate 46 through a pin 52 which is parallel to the pin 51.

In the winding mechanism 26, the expanding or retracting operation of the swinging cylinder 44 causes each pivotal arm 42 to be swung between a position in which the arrest claw 43 abuts against the catalyst 3 and a position in which the claw is retracted to the side with respect to the catalyst 3 as shown by a broken line in FIG. 5. Moreover, when the seal mat 17 is fitted in the groove 40 in the receiving member 37, the opposite ends of the seal mat 17 extend sideways from the receiving member 37, and the arrest claw 43 in the retracted state are located below the extended portions of the seal mat 17. Therefore, if each pivotal arm 42 is turned so that the arrest claw 43 is swung from the retracted state towards the catalyst 3, the extended portion of the seal mat 17 is fitted into the groove 50 in the arrest claw 43 and is picked up. When the arrest surface 49 of the arrest claw 43 abuts against the outer surface of the catalyst 3, the seal mat 17 is wound around the catalyst 3 over the entire periphery thereof. Then, the opposite ends of the seal mat 17 are adhered with an adhesive tape 53 to complete the winding up of the seal mat 17.

Figure 6:
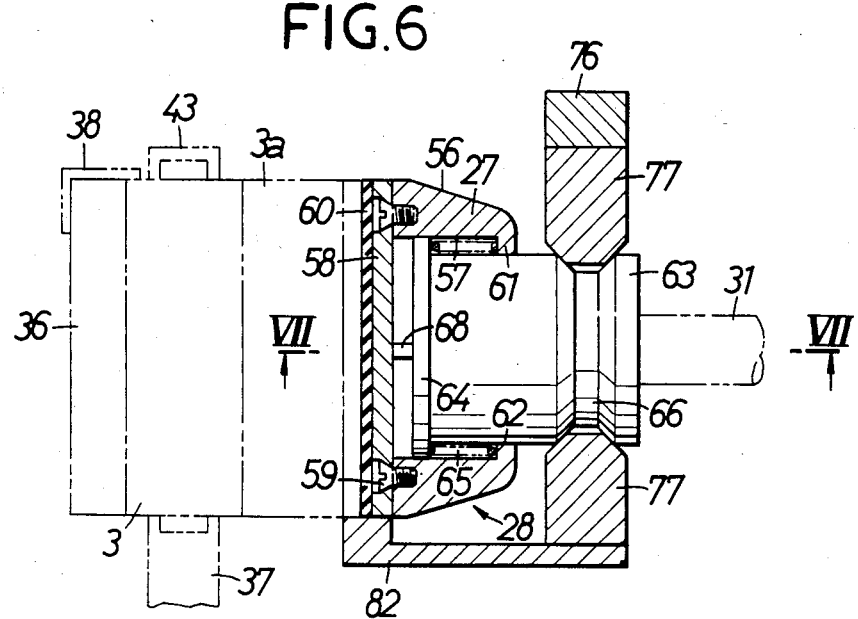
FIG. 6 is an enlarged side view in vertical section of a guide mechanism of the present invention.
Figure 7:
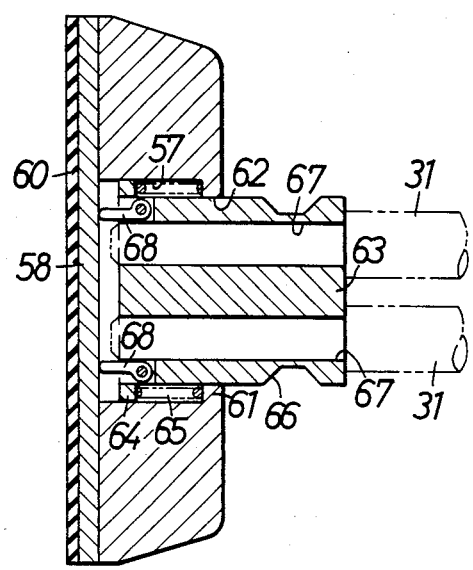
FIG. 7 is a sectional view taken along the line VII—VII of FIG. 6.

As seen in FIGS. 6 and 7, the guide mechanism 28 comprises a guide member 27 and a support 63 fitted in the guide member 27 for axial movement relative thereto, and is coaxially disposed adjacent the catalyst 3 on the receiving member 37. The guide member 27 has an elliptic cross-section, with its outer inclined surface gradually enlarged towards the catalyst 3 on the receiving member 37. The guide member 27 also has a relatively large bore 57 concentric with the interior thereof. A blocking plate 58 closes the open end of the bore 57 and is secured to the end of the guide member 27 close to the catalyst 3 by a threaded member 59, and a resilient plate 60 is affixed to the blocking plate 58 and abuts against the end surface of the catalyst 3.

A radially inward projecting inner jaw 61 is provided over the entire periphery on the opened end of the bore 57 opposite the catalyst 3 and defines a slide-fit bore 62 concentric with the bore 57. A columnar support 63 is slidably fitted in the slide-fit bore 62 and an outer jaw 64 is provided over the entire periphery at the forward end of the support 63. The support 63 slidably projects into the bore 57.

The support 63 and the guide member 27 are relatively movable in the axial direction, and the support 63 is supported by the clamp mechanism 29 or the support arm 31. Therefore, the support 63 is in a fixed position and the guide member 27 is relatively movable in the axial direction with respect to the support 63. Further, a spring 65 is interposed between the inner jaw 61 and the outer jaw 64 to surround the support 63 for resiliently biasing the inner and outer jaws away from each other, i.e., the guide member 27 is biased away from the catalyst 3 on the receiving member 37.

To support the support 63 with the clamp mechanism 29, an annular groove 66, which narrows towards the bottom, is provided in the outer surface of that portion of the support 63 which extends out from the slide-fit bore 62. A pair of insert holes 67 are formed in support 63 for permitting the insertion of the support arms 31 thereinto. Urging arms 68 are pivotally connected to the support 63 at the blocking plate 58. The urging arms 68 pivot between a state in which each arm extends perpendicularly to the insert holes 67 and a state in which each arm projects toward the blocking plate 58 parallel to the insert holes 67. Each urging arm 68 is resiliently biased by a spring (not shown) towards the state in which it extends perpendicularly to the insert hole 67. When each urging arm 68 is forcably turned by the support arm 31 and abuts against the blocking plate 58 and thus, the guide member 27 is caused to move toward the catalyst 3 against the spring force of the spring 65.

Figure 8:
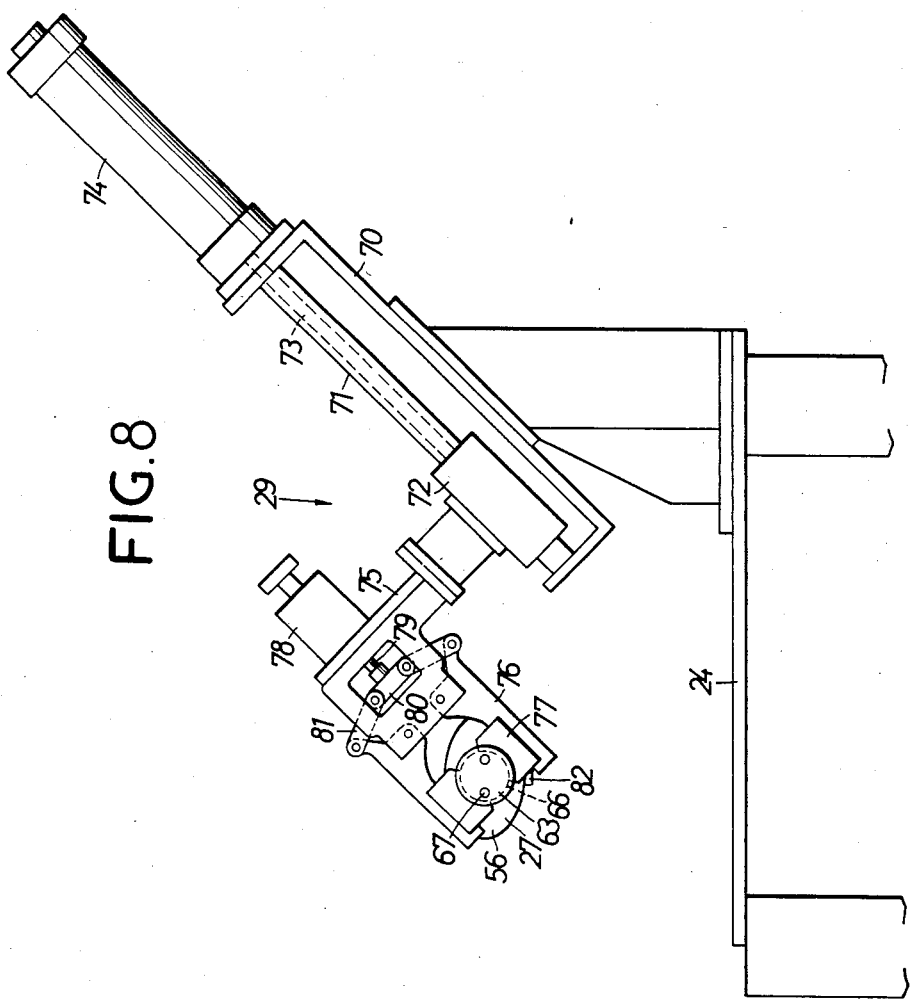
FIG. 8 is an enlarged sectional view taken along the line VIII—VIII of FIG. 3.

Referring to FIG. 8, the clamp mechanism 29 is disposed to the side of the support 63 in a position associated with the annular groove 66 in the support 63. More specifically, the clamp mechanism 29 comprises a support frame 70 fixedly mounted on the base 24 in an inclined manner to extend upwardly as it becomes clear of the side of the support 63. A member 72 is movable along a pair of guide rods 71 fixed on the support frame 70, a displacing cylinder 74 is fixedly mounted on the support frame 70 and has a piston 73 connected to the movable member 72, and a frame 75 is mounted on the movable member 72. A pair of openable and closable arms 76 are carried on the frame 75 for turning movement about an axis parallel to the axis of the support 63. The clamp arms 77 are each fixedly mounted on the forward end of each openable and closable arm 76, opening and closing cylinder 78 is fixedly mounted on the frame 75, and links 81 are connected to a connecting plate 80 and are coupled to the piston 79 of the opening and closing cylinder 78, with the end of each openable and closable arm 76.

The movable member 72 is reciprocally moved along the guide rods 71 in accordance with the expansion and contraction of the displacing cylinder 74. Accordingly, the openable and closable arms 76 are pivotally movable between a state in which the clamping claws 77 thereof clamp the support 63 from above and below, and a state in which the clamp claws 77 are retracted obliquely upwardly with respect to the support 63.

Upon expansion or retraction of the opening and closing cylinder 78, both the openable and closable arms 76 are operated to open or close. When both openable and closable arms 76 have been closed in the positions associated with the support 63, the individual clamp claws 77 are fitted into the corresponding annular grooves 66 to clamp the support 63 from opposite sides, thereby supporting the guide member 27.

A rest 82 is integrally mounted on the lower clamp claw 77 and extends to the catalyst 3 in the receiving member 37. When the support 63 is clamped by both of the clamp claws 77, the rest 82 abut against the lower surface of the catalyst 3 at the end thereof close to the guide member 27 to support the catalyst 3. When the clamping of the support 63 by the clamp claws 77 is released, the rest 82 is also retracted to release the support of the catalyst 3.

Figure 9:
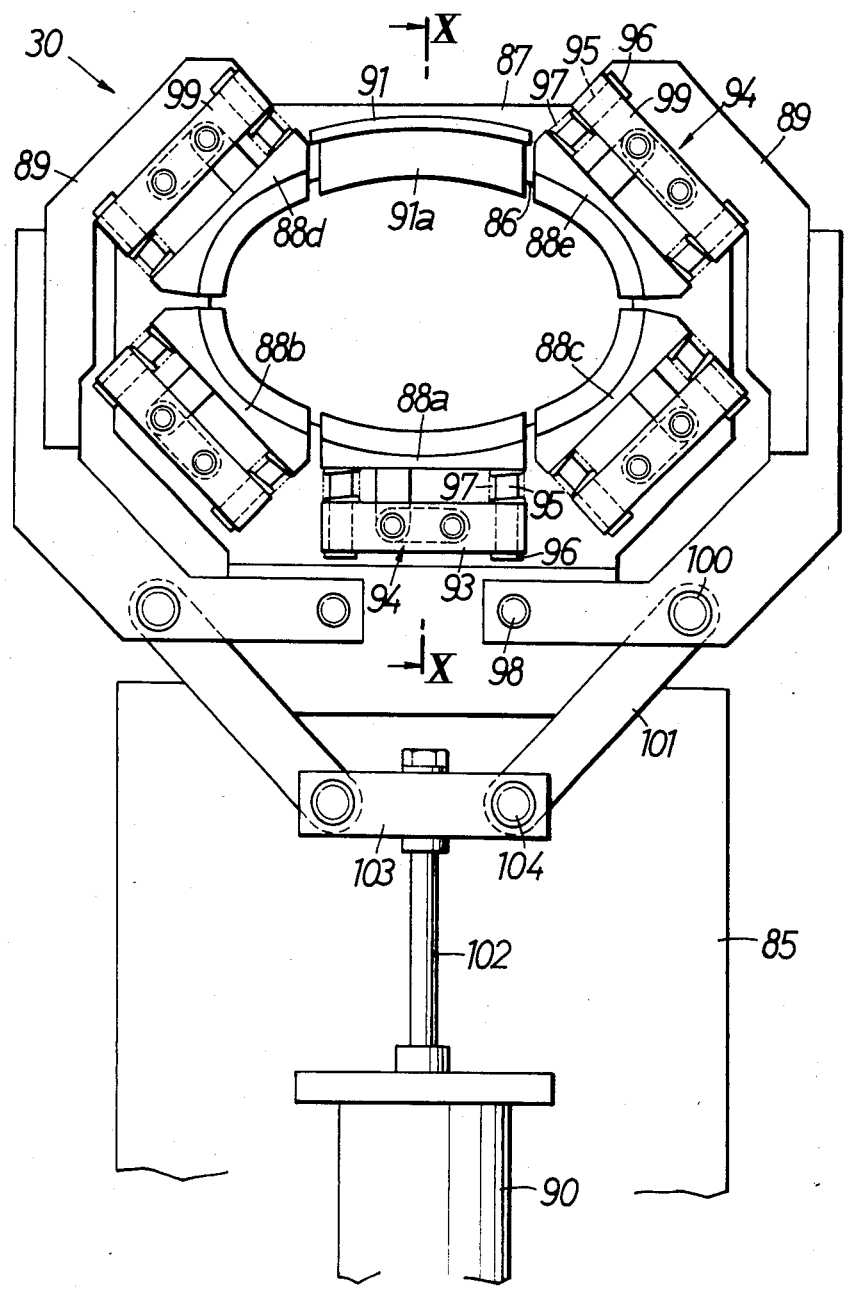
FIG. 9 is an enlarged view as viewed in a direction of the arrow IX of FIG. 3.
Figure 10:
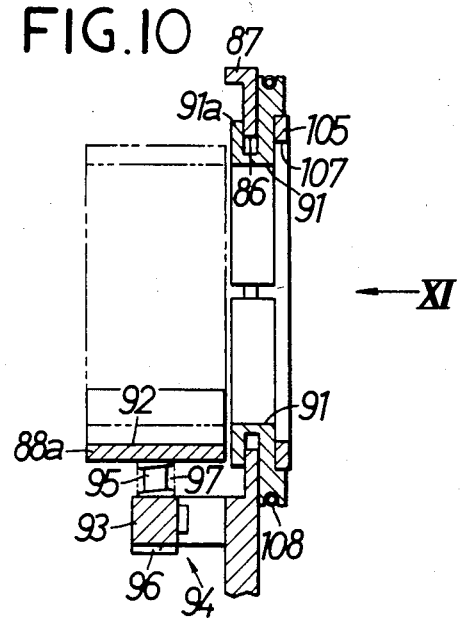
FIG. 10 is a sectional view taken along the line X—X of FIG. 9.
Figure 11:
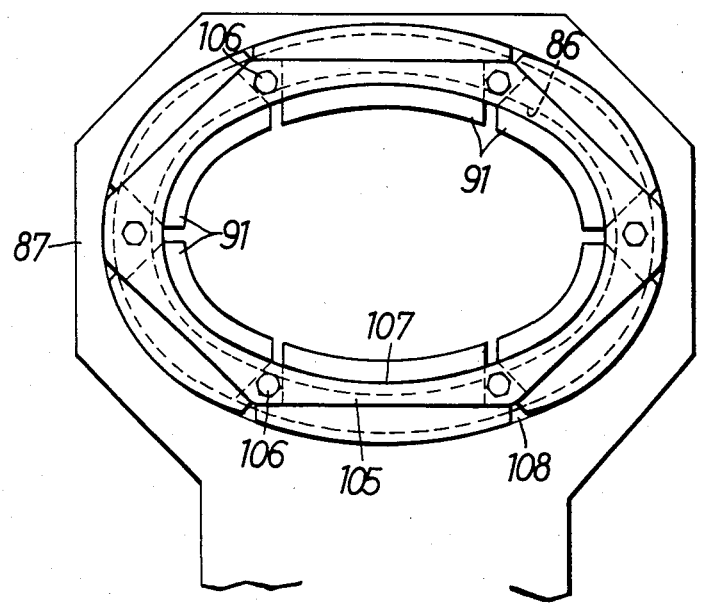
FIG. 11 is a view as viewed in a direction of the arrow XI of FIG. 10.

Referring to FIGS. 9, 10, and 11, the holding and urging mechanism 30 is disposed to the side of catalyst 3 for movement along the axis of the catalyst 3. The holding and urging mechanism 30 comprises a movable member 85 connected to the drive mechanism 32, and a base plate 87 secured to the movable plate 85 and having an opening 86 which permits the insertion of the guide member 27 therethrough in accordance with the movement of the movable plate 85. A plurality of, e.g., three holding pieces 88a, 88b and 88c, are arranged and supported along the peripheral edge of the opening 86 at the side close to the guide mechanism 30 with respect to the base plate 87, and a pair of holding arms 89 are pivotally carried on the base plate 87. Holding pieces 88d and 88e are each carried on the forward end of the corresponding holding arm 89, and a holding cylinder 90 is supported on the movable plate 85 and has a vertically extending axis about which both the holding arms 89 are to be turned. A plurality of, e.g., six urging plates 91 are carried on the base plate 87 along the peripheral edge of the opening 86.

Each of the holding pieces 88a to 88e has a holding surface 92 curved to conform to the outer peripheral surface of the mesh ring 16 which is held by the holding surface 92. In other words, three holding pieces 88a to 88c are carried on the base plate 87 at positions associated with the lower half outer peripheral surface of the mesh ring 16. Supporting protrusions 93 are mounted on the base plate 87 in a corresponding relation to the three holding pieces 88a to 88c, respectively. The individual holding pieces 88a to 88c are connected to the corresponding supporting protrusions 93 through links 94, respectively. Thus, each of the holding pieces 88a to 88c is movable towards or away from the supporting protrusion 93. A pair of guide rods 95 movably penetrate the supporting protrusion 93, each guide rod 95 having one end secured to each of the holding pieces 88a to 88c and the other end engaged with a connecting jaw 96 engaging the supporting protrusion 93. Consequently, each of the holding pieces 88a to 88c is movable away from the supporting projection 93 to a position in which the connecting jaw 96 engages the supporting protrusion 93. Moreover, a spring 97 is positioned between each supporting protrusion 93 and each of the holding pieces 88a to 88c to surround each guide rod 95, so that each of the holding pieces 88a to 88c is resiliently biased away from the supporting protrusion 93.

Each holding arm 89 is formed into a substantially C-shape and is pivotally supported at its base end on the side surface of the base plate 87 at the side close to the guide mechanism 28 by a pivot 98. Thus, both of the holding arms 89 are movable towards or away from the mesh ring 16 placed on the holding surfaces 92 of the individual holding pieces 88a to 88c at the opposite sides of the mesh ring 16.

Each holding arm 89 is provided at its forward end with a supporting protrusion 99, and like holding pieces 88a to 88c, the holding pieces 88d and 88e are connected to the supporting protrusion 99 through a link mechanism 94, guide rollers 95 each having an engaging jaw 96 and a spring 97. Thus, when each holding arm 89 is turned towards the mesh ring 16, the holding surface 92 of each holding piece 88d, 88e, resiliently abuts against the upper outer surface of the mesh ring 16.

A link 101 is connected at one end thereof to the intermediate portion of each holding arm 89 through a pin 100 parallel to the pivot 98 to turn each holding arm 89. On the other hand, a connecting plate 103 is coupled with the forward or upper end of a piston rod 102 in the holding cylinder 90, and the other ends of the links 101 are connected to the opposite ends of the connecting plate 103 through pins 104 parallel to the pin 100, respectively. Thus, each holding arm 89 is operable to open or close in accordance with the expansion or contraction of the holding cylinder 89.

Each pushing plate 91 is formed to have a substantially U-shaped cross-section and is fitted over the peripheral edge of the opening 86 in the base plate 87. A clamp plate 105 is secured by a plurality of bolts 106 on the side surface of the base plate 87 which is opposite to the side of holding pieces 88a to 88c, which are disposed and adapted to clamp each urging plate 91 for movement between the clamp plate itself and the base plate 87. The clamp plate 105 has a through hole 107 to permit the insertion of the catalyst 3 therethrough, and each bolt 106 is threaded into the base plate between the individual adjacent push plates 91.

An endless spring 108 is wound around the outer periphery of each push plate 9, so that each push plate 91 is supported between the base plate 87 and the clamp plate 105 such that it is inwardly biased by the spring. Furthermore, one side surface 91a of each push plate 91 faces the end surface of the mesh ring 16 held by the holding pieces 88a to 88e, so that the surface abuts against the mesh ring 16 to push it.

Referring to FIGS. 12 and 13, the drive mechanism 32 is disposed on the base 24 at the side opposite the guide mechanism 28 with respect to the urging mechanism 30. The drive mechanism 32 comprises a first drive cylinder 112 for driving the support arm 31, and the second drive cylinder 113 for driving the holding and urging mechanism 30. The drive cylinders are supported and fixed on a support frame 11 securely mounted on the base 24 with the axes parallel to each other.

The support frame 111 is substantially U-shaped with side plates 114 and 115 opposed to each other at a distance along the extension of the axis of the catalyst 3 and interconnected by a bottom plate 116 fixedly mounted on the base 24. The upper portion of the support frame 111 is covered by a cover 117.

The first drive cylinder 112 is fixed and horizontally supported on the central upper portion of the one side plate 114, and has a piston 118 which passes through the side plate 114 into the support frame 111. A pair of guide rods 119, each having an axis parallel to the first drive cylinder, are supported for movement along the axes thereof on the opposite sides of the lower portions of the side plates 114 and 115. A cylindrical sleeve 120 is fitted over each guide rod 119 at an intermediate portion thereof within the support frame 111 for relative movement in the axial direction, and the piston 118 is secured at its forward end to the central portion of a connecting member 121 interconnecting the sleeves 120. Thus, the connecting member 121 can be guided and moved by the guide rods 119 in accordance with the expansion and contraction of the first cylinder 112.

A push rod 122 having an axis on the extension of the axis of the piston 118 is secured to the connecting member 121, and the pair of support arms 31 is mounted in parallel on the forward end of the push rod 122. Each of the support arms 31 is provided at its base with a forwardly faced step 31a which is adapted to abut against the end surface of the support 63 in guide mechanism 28 when each support arm 31 is passed through the holding and urging mechanism 30 and set into the insert hole 67 in the support 63.

To regulate the amount of movement of support arm 31, an arm 123 projects outwardly from the support frame 111 and is secured to one of the sleeves 120. A pair of dogs 124 are fixed to the forward end of the arms 123 at a distance spaced in a direction parallel to the axis of the guide rod 119. On the other hand, a pair of limit switches 125 operated by the dogs 124 are fixedly mounted on the base 24 at positions spaced in a direction parallel to the axis of the guide rod 119. Thus, the amount of expansion or contraction of the first drive cylinder 112, i.e., the amount of movement of the support arm 31 is regulated by the dogs 124 and limit switches 125.

One end of each guide rod 119 is movably passed through the side plate 115 and secured to the movable plate 85 in the holding and urging mechanism 30. Thus, the holding and urging mechanism 30 can also be moved in accordance with the movement of the guide rods 119.

To drive the guide rods 119, the second drive cylinder 113 is supported and fixed on the support frame 11 below the push rod 122. The second drive cylinder 113 has a piston 126 which is connected to the aforesaid movable plate 85 and thus, the guide rods 119 are connected to the piston 126 of the second drive cylinder 113 through the movable plate 85.

The other ends of guide rods 119 pass through the side plate 114 and extend outwardly, and the outwardly extending ends of the guide rods 119 are connected to each other through a connecting plate 127. A support arm 128 is suspended downwardly from the central portion of the connecting plate 127, and a pair of dogs 129 are fixedly mounted on the lower end of the support arm 128 spaced from and in a direction parallel to each guide rod 119. A support plate 130 extends outwardly in parallel to and below the guide rods 119 and is secured to the outer surface of the side plate 114. A pair of limit switches 131, which are operated by the movement of the respective dogs 129, are fixedly mounted on the support plate 130 at a distance spaced from each other. The amount of expansion or contraction of the second drive cylinder 113, i.e., the amount of movement of the guide rods 119 and the holding and urging mechanism 30 is regulated by the cooperation of the dogs 129 with the limit switches 131.

Having described in detail the construction of one of the assembling apparatus 23, the other assembling apparatus 23 is also constructed in the very similar manner and thus, both of the assembling apparatuses 23 are disposed in a lateral, symmetrical relation on the base 24.

Figure 14A:
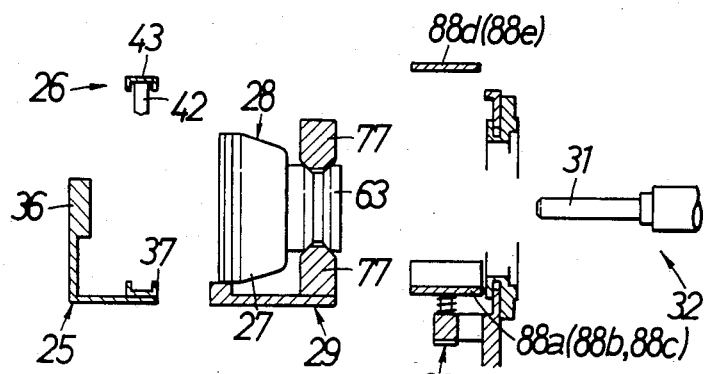
FIG. 14a to 14e are a view for explaining the operation of the present invention.

Description will now be made of the operation of this embodiment of the present invention with reference to FIGS. 14a to 14e. In assembling the insert assembly 22 in the construction of the catalytic converter 1, at first, as shown in FIG. 14a, the swinging cylinder 44 in the winding mechanism 26 has been retracted to open the pivotal arm 42 and retract the arrest claw 43 to the side. In the clamp mechanism 29, the opening and closing cylinder 78 has been retracted to close the opening and closing arm 76 and grasp the support 63 of the guide mechanism 28 with the clamp claws 77. Further, the first and second drive cylinders 112 and 113 have been retracted so that the support arm 31 is separated from the guide mechanism 28 and the holding and urging mechanism 30 is separated from the guide mechanism 28. Furthermore, in the holding and urging mechanism 30, the holding cylinder 90 is retracted to open the holding arms 89, so that the holding pieces 88d and 88e are retracted to the side.

Figure 14B:
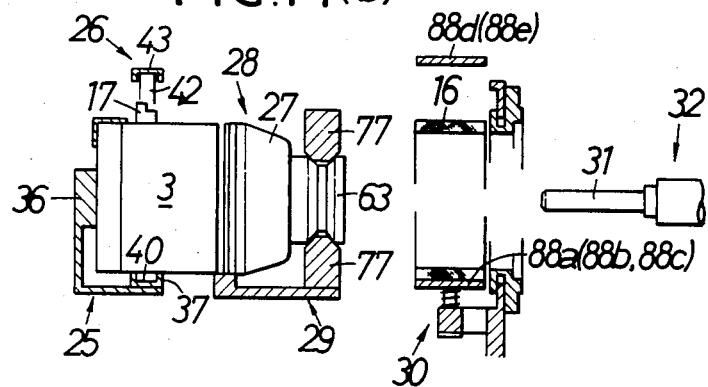

Then, as shown in FIG. 14b, the seal mat 17 is fitted into the groove 40 in the receiving member 37 of the positioning rest 25, following which the catalyst 3 is placed onto and positioned on the receiving member 37 and the rest 82. At the same time, the mesh ring 16 is placed onto the individual holding pieces 88a to 88c of the holding and urging mechanism 30.

Figure 14C:
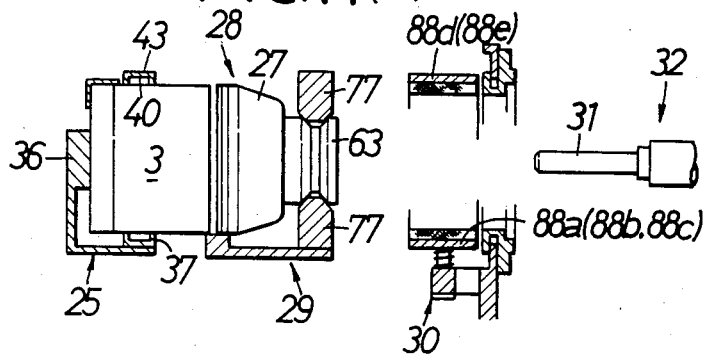

Thereafter, as shown in FIG. 14c, the swinging cylinder 44 of the winding mechanism 26 is expanded to pivot the pivotal arms 42 towards the catalyst 3, picking up the seal mat 17 and winding it around the catalyst 3 with the arrest claws 43 to bond the opposite ends of the seal mat 17 to each other with an adhesive tape 53. In the holding and urging mechanism 30, the holding cylinder 90 is expanded to pivot the holding arm 89. The holding pieces 88d and 88e thereby abut against the upper outer surface of the mesh ring 16, thus inwardly urging and holding the mesh ring 16 with the individual holding pieces 88a and 88e.

Figure 14D:
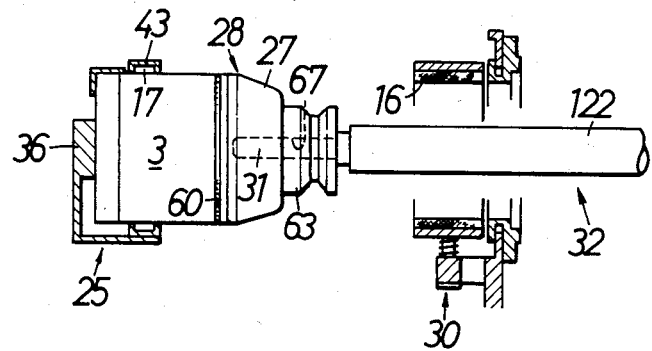

When the mesh ring 16 is held by the holding and urging mechanism 30, the first drive cylinder 112 of the drive mechanism 32 is operated to expand, so that the push rod 122 is moved through the mesh ring 16 towards the guide mechanism 28, as shown in FIG. 14d. The support arms 31 at the forward end of the push rod 122 are thereby inserted into the insert hole 67 in the support 63 of the guide mechanism 28, so that the urging arms 68 are pushed by the forward ends of the support arms 31, causing the guide member 27 to move towards the catalyst 3. Thus, the catalyst 3 is clamped between the abutment plate 36 and the resilient plate 60 of the guide member 27.

In this way, the guide mechanism 28 is supported by the support arms 31. In this case, the supporting of the guide mechanism 28 from the sides by the clamp mechanism 29 is unnecessary and hence, in the clamp mechanism 29, the opening and closing cylinder 78 is expanded to open the arms 76, releasing the supporting of the support 63 by the clamp claws 77. Further, the retracting operation of the displacing cylinder 74 causes the clamp claws 77 to be retracted to a position in which they will not interfere with the movement of the holding and urging mechanism 30.

Figure 14E:
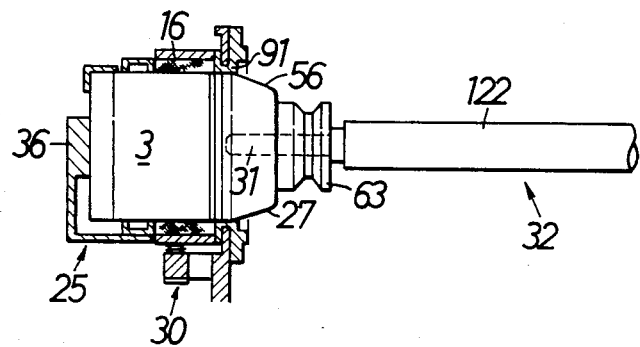

Then, as shown in FIG. 14e, the second drive cylinder 113 of the drive mechanism 32 is operated to expand, thereby allowing the holding and urging mechanism 30 to be moved towards the catalyst 3 by the guide rods 119. This movement of the holding and urging mechanism 30 causes the mesh ring 16 to move towards the catalyst 3 while being gradually expanded outwardly by the inclined outer surface 56 of the guide member 27. The individual push plates 91 pushing the mesh ring 16 are slidably supported between the base plate 87 and the clamp plate 105 and hence, they push the mesh ring 16 while expanding it with the outer inclined surface 56 of the guide member 27, until the mesh ring 16 has ultimately been fitted onto the portion 3a of the catalyst 3.

After fitting of the mesh ring 16 on the catalyst 3, the reverse operation procedure can be followed from FIG. 14d to FIG. 14a to provide the insert assembly 22 including the catalyst 3, the mesh ring 16 and the seal mat 17. A pair of insert assemblies 22 are prepared and then installed within the casing 2 along with the end protecting members 18 and 19 and the protector 20 or the like, whereby the catalytic converter 1 can be provided.

In the above embodiment, the catalytic converter 1 has been described as being of a construction that the pair of catalysts 3 are arranged longitudinally in a row within the casing 2, but it is to be understood that the present invention is applicable to a catalytic converter having a single catalyst 3 contained within the casing. The configuration in cross-section of the catalyst 3 is not limited to an ellipse, but the catalyst may be circular or rectangular.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

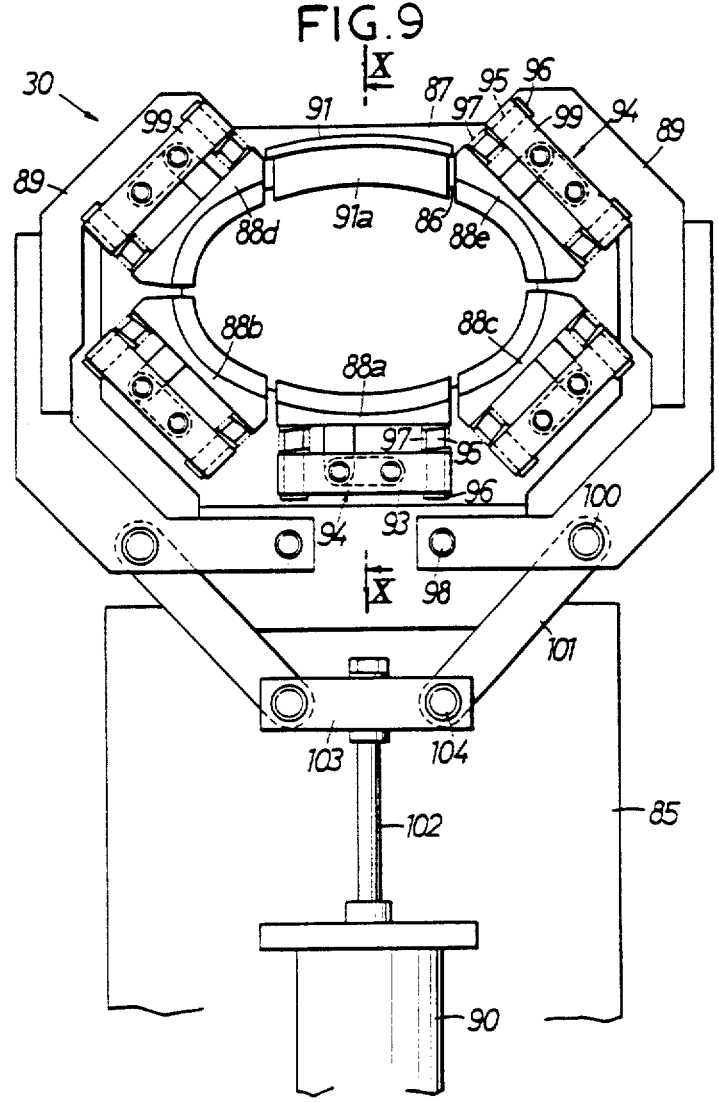

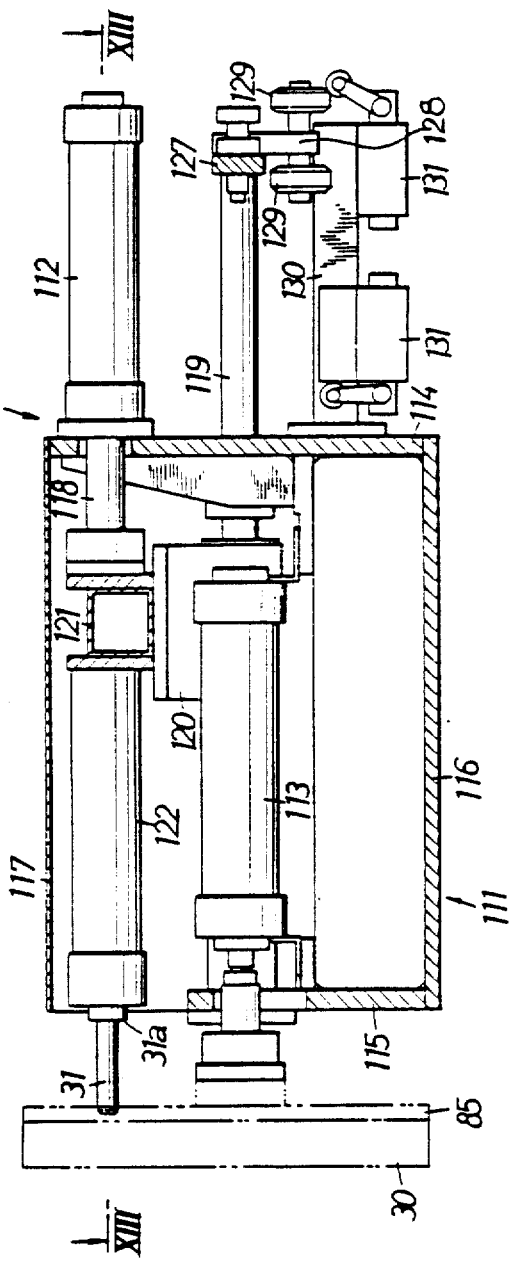

We claim:

1. A method for attaching a cylindrical ring-like part to the outer periphery of a columnar material, said method comprising:

positioning and supporting the columnar material with its axis horizontally oriented;

supporting a guide member on the sides thereof to position the guide member adjacent to the columnar material on the same axis as the columnar material, wherein the guide member has an outer inclined surface enlarged toward the columnar material;

positioning the cylindrical ring-like part, on the same axis as the columnar material at the side of the guide member opposite to the side of the columnar material;

supporting the guide member from the axial directions thereof, and concurrently, releasing the support thereof from the sides and pushing the cylindrical ring-like part while guiding the cylindrical ring-like part on the outer inclined surface of the guide member to fit the cylindrical ring-like part over a portion of the columnar material; and releasing the pushing of the cylindrical ring-like part and then supporting the guide member on the sides thereof, whie concurrently, releasing the support thereof from the axial direction.

2. An apparatus for attaching a cylindrical ring-like part to the outer periphery of a columnar material, comprising:

a positioning means for positioning the columnar material with its axis oriented horizontally with a portion to which the cylindrical ring-like part is to be attached being exposed;

a guide means including a guide member having an outer inclined surface enlarged towards the columnar material;

a clamp means for supporting the guide means from the sides thereof to position the guide member on the same axis as the columanr material at a position adjacent to the columnar material on the positioning means;

a support arm axially movable to support the guide means from the axial direction;

said clamp means and said support arm alternatingly providing support for the guide means;

a holding and urging means for supporting the cylindrical ring-like part on the same axis as the columnar material at the side of the guide means opposite to the side of the columnar material, and for pushing the cylindrical ring-like part towards the columnar material; and a drive means connected to the support arm and the holding and urging means for driving the support arm and the holding and urging means.

3. An apparatus for attaching a cylindrical ring-like part to the outer periphery of a columnar material, comprising:

a positioning means for positioning the columnar material with its axis oriented horizontally with a portion to which the cylindrical ring-like part is to be attached being exposed;

a guide means including a guide member having an outer inclined surface enlarged towards the columnar material;

a clamp means for supporting the guide means from the sides thereof to position the guide member on the same axis as the columnar material at a position adjacent to the columnar material on the positioning means;

a support arm axially movable to support the guide means from the axial direction;

said clamp means and said support arm alternatingly providing support for the guide means;

a holding and urging means for supporting the cylindrical ring-like part on the same axis as the columnar material at the side of the guide means opposite to the side of the columnar material, and for pushing the cylindrical ring-like part towards the columnar material;

a drive means connected to the support arm and the holding and urging means for driving the support arm and the holding and urging means; and the clamp means is shiftable between a state in which the clamp means supports the guide means from the sides thereof and a state in which the clamp means releases the support and is retracted to the side thereof, and wherein the clamp means includes a rest for carrying the other end of the columar material only in the guide means supporting state.

4. An apparatus for attaching a cylindrical ring-like part to the outer periphery of a columnar material, comprising:

a positioning means for positioning the columnar material with its axis oreinted horizontally with a portion to which the cylindrical ring-like part is to be attached being exposed;

a guide means including a guide member having an outer inclined surface enlarged towards the columnar material;

a clamp means for supporting the guide means from the sides thereof to position the guide member on the same axis as the columnar material at a position adjacent to the columnar material on the positiong means;

a support arm axially movable to support the guide means from the axial direction;

said clamp means and said support arm alternatingly providing support for the guide means;

a holding and urging means for supporting the cylindrical ring-like part on the same axis as the columnar material at the side of the guide means opposite to the side of the columnar material, and for pushing the cylindrical ring-like part towards the columnar material;

a drive means connected to the support arm and the holding and urging means for driving the support arm and the holding and urging means; and the guide means comprises the outer inclined surface and a guide member including at one end thereof a resilient plate for abutting against the columnar material, a support having an axial through hole over the entire length thereof, wherein the guide member and the support are fitted to each other for axial relative movement on the same axis as the axis of the columnar material laid on the positioning means, and a spring means mounted between the guide member and the support for exerting a spring force on the resilient plate of the guide member to bias the guide member away form the columnar material, and wherein the support arm is adapted to push the guide member such that the resilient plate abuts against the columnar material, when the guide member is inserted through the through hole.

5. An apparatus for attaching a cylindrical ring-like part to the outer periphery of a columnar material, comprising:

a positioning means for positioning the columnar material with its axis oriented horizontally with a portion to which the cylindrical ring-like part is to be attached being exposed;

a guide means including a guide member having an outer inclined surface enlarged towards the columnar material;

a clamp means for supporting the guide means from the sides thereof to position the guide member on the same axis as the columnar material at a position adjacent to the columnar material on the positioning means;

a support arm axially movable to support the guide means from the axial direction;

said clamp means and said support arm alternatingly providing support for the guide means;

a holding and urging means for supporting the cylindrical ring-like part on the same axis as the columnar material at the side of the guide means opposite to the side of the columnar material, and for pushing the cylindrical ring-like part towards the columnar material;

a drive means connected to the support arm and the holding and urging means for driving the support arm and the holding and urging means;

the clamp means is shiftable between a state in which the clamp means supports the guide means from the sides thereof and a state in which the clamp means releases the support and is retracted to the side thereof, and wherein the clamp means includes a rest for carrying the other end of the columnar material only in the guide means supporting state; and the guide means comprises the outer inclined surface and a guide member including at one end thereof a resilient plate for abutting against the columnar material, a support having an axial through hole over the entire length thereof, wherein the guide member and the support are fitted to each other for axial relative movement on the same axis as the axis of the columnar material laid on the positioning means, and a spring means mounted between the guide member and the support for exerting a spring force on the resilient plate of the guide member to bias the guide member away from the columnar material, and wherein the support arm is adapted to push the guide member such that the resilient plate abuts against the columnar material, when the guide member is inserted through the through hole.

6. An apparatus for attaching a cylindrical ring-like part to the outer periphery of a columnar material, comprising:

a positioning means for positioning the columnar material with its axis oriented horizontally with a portion to which the cylindrical ring-like part is to be attached being exposed;

a guide means including a guide member having an outer inclined surface enlarged towards the columnar material;

a clamp means for supporting the guide means from the sides thereof to position the guide member on the same axis as the columnar material at a position adjacent to the columnar material on the positioning means;

a support arm axially movable to support the guide means from the axial direction;

said clamp means and said support arm alternatingly providing support for the guide means;

a holding and urging means for supporting the cylindrical ring-like part on the same axis as the columnar material at the side of the guide means opposite to the side of the columnar material, and for pushing the cylindrical ring-like part towards the columnar material;

a drive means connected to the support arm and the holding and urging means for driving the support arm and the holding and urging means; and the drive means includes a stationary supporting frame, a guide rod connected to the holding and urging means, the guide rod extending in parallel to the direction of operation of the support arm and the holding and urging means, wherein the guide rod is carried on the supporting frame from movement along the axis of the supporting frame, and a sleeve, connected to the support arm and a drive mechanism, the sleeve being slidably fitted over the guide rod for axial movement relative thereto.

7. An apparatus for attaching a cylindrical ring-like part to the outer periphery of a columnar material, comprising:

a positioning means for positioning the columnar material with its axis oriented horizontally with a portion to which the cylindrical ring-like part is to be attached being exposed;

a guide means including a guide member having an outer inclined surface enlarged towards the columnar material;

a clamp means for supporting the guide means from the sides thereof to position the guide member on the same axis as the columnar material at a position adjacent to the columnar material on the positioning means;
a support arm axially movable to support the guide means from the axial direction;
said clamp means and said support arm alternatingly providing support for the guide means;
a holding and urging means for supporting the cylindrical ring-like part on the same axis as the columnar material at the side of the guide means opposite to the side of the columnar material, and for pushing the cylindrical ring-like part towards the columnar material;
a drive means connected to the support arm and the holding and urging means for driving the support arm and the holding and urging means;
the clamp means is shiftable between a state in which the clamp means supports the guide means from the sides thereof and a state in which the clamp means releases the support and is retracted to the side thereof, and wherein the clamp means includes a rest for carrying the other end of the columnar material only in the guide means supporting state; and
the drive means includes a stationary supporting frame, a guide rod connected to the holding and urging means, the guide rod extending in parallel to the direction of operation of the support arm and the holding and urging means, wherein the guide rod is carried on the supporting frame for movement along the axis of the supporting frame, and a sleeve, connected to the support arm and a drive mechanism, the sleeve being slidably fitted over the guide rod for axial movement relative thereto.

8. An apparatus for attaching a cylindrical ring-like part to the outer periphery of a columnar material, comprising:
a positioning means for positioning the columnar material with its axis oriented horizontally with a portion to which the cylindrical ring-like part is to be attached being exposed;
a guide means including a guide member having an outer inclined surface enlarged towards the columnar material;
a clamp means for supporting the guide means from the sides thereof to position the guide member on the same axis as the columnar material at a position adjacent to the columnar material on the positioning means;
a support arm axially movable to support the guide means from the axial direction;
said clamp means and said support arm alternatingly providing support for the guide means;
a holding and urging means for supporting the cylindrical ring-like part on the same axis as the columnar material at the side of the guide means opposite to the side of the columnar material, and for pushing the cylindrical ring-like part towards the columnar material;
a drive means connected to the support arm and the holding and urging means for driving the support arm and the holding and urging means;
the clamp means is shiftable between a state in which the clamp means supports the guide means from the sides thereof and a state in which the clamp means releases the support and is retracted to the side thereof, and wherein the clamp means includes a rest for carrying the other end of the columnar material only in the guide means supporting state;
the guide means comprises the outer inclined surface and a guide member including at one end thereof a resilient plate for abutting against the columnar material, a support having an axial through hole over the entire length thereof, wherein the guide member and the support are fitted to each other for axial relative movement on the same axis as the axis of the columnar material laid on the positioning means, and a spring means mounted between the guide member and the support for exerting a spring force on the resilient plate of the guide member to bias the guide member away from the columnar material, and wherein the support arm is adapted to push the guide member such that the resilient plate abuts against the columnar material, when the guide member is inserted through the through hole; and
wherein the drive means includes a stationary supporting frame, a guide rod connected to the holding and urging means, the guide rod extending in parallel to the direction of operation of the support arm and the holding and urging means, wherein the guide rod is carried on the supporting frame for movement along the axis of the supporting frame, and a sleeve, connected to the support arm and a drive mechanism, the sleeve being slidably fitted over the guide rod for axial movement relative thereto.

9. An apparatus for attaching a cylindrical ring-like part to the outer periphery of a columnar material, comprising:
a positioning means for positioning the columnar material with its axis oriented horizontally with a portion to which the cylindrical ring-like part is to be attached being exposed;
a guide means including a guide member having an outer inclined surface enlarged towards the columnar material;
a clamp means for supporting the guide means from the sides thereof to position the guide member on the same axis as the columnar material at a position adjacent to the columnar material on the positioning means;
a support arm axially movable to support the guide means from the axial direction;
said clamp means and said support arm alternatingly providing support for the guide means;
a holding and urging means for supporting the cylindrical ring-like part on the same axis as the columnar material at the side of the guide means opposite to the side of the columnar material, and for pushing the cylindrical ring-like part towards the columnar material;
a drive means connected to the support arm and the holding and urging means for driving the support arm and the holding and urging means;
the guide means comprises the outer inclined surface and a guide member including at one end thereof a resilient plate for abutting against the columnar material, a support having an axial through hole over the entire length thereof, wherein the guide member and the support are fitted to each other for axial relative movement on the same axis as the axis of the columnar material laid on the positioning means, and a spring means mounted between the guide member and the support for exerting a spring force on the resilient plate of the guide member to bias the guide member away from the columnar material, and wherein the support arm is adapted to push the guide member such that the resilient plate abuts against the columnar material, when the guide member is inserted through the through hole; and the drive means includes a stationary supporting frame, a guide rod connected to the holding and urging means, the guide rod extending in parallel to the direction of operation of the support arm and the holding and urging means, wherein the guide rod is carried on the supporting frame for movement along the axis of the supporting frame, and a sleeve, connected to the support arm and a drive mechanism, the sleeve being slidably fitted over the guide rod for axial movement relative thereto.

* * * * *

UNITED STATES PATENT AND TRADEMARK OFFICE
CERTIFICATE OF CORRECTION

PATENT NO. : 4,738,013

DATED : April 19, 1988

INVENTOR(S) : Sachihiro YAMASHITA; Masayuki ENOMOTO; Ichiro ISHIBASHI; Kiyohiro ICHINOSE; and Mitsuki NAKAMURA It is certified that error appears in the above-identified patent and that said Letters Patent is hereby corrected as shown below:

Please correct the drawings as follows:

Figure 9, please reverse the direction of the cross-section arrows X - X.

Figure 12, please add reference numeral 128 and associated lead line to the lower right hand corner of Figure 12.

(per attached sheets)

Signed and Sealed this

First Day of November, 1988

Attest:

DONALD J. QUIGG

Attesting Officer

Commissioner of Patents and Trademarks